United States Patent [19]
Gilbert

[11] 3,838,873
[45] Oct. 1, 1974

[54] HOSE COUPLING WITH CAPTIVE RETAINING RING

[76] Inventor: Stephen J. Gilbert, 602 Roxbury Dr., Beverly Hills, Calif. 90210

[22] Filed: Apr. 30, 1973

[21] Appl. No.: 355,923

[52] U.S. Cl. ............................................. 285/174
[51] Int. Cl. ............................................. F16l 55/00
[58] Field of Search .......... 285/174, 8, 49, 223, 238

[56] References Cited
UNITED STATES PATENTS

| 3,394,950 | 7/1968 | Jensen | 285/174 |
| 3,603,621 | 9/1971 | Parsons | 285/174 |
| 3,633,948 | 1/1972 | Dickey | 285/174 |

*Primary Examiner*—Patrick D. Lawson
*Attorney, Agent, or Firm*—Fulwider, Patton, Rieber, Lee & Utecht

[57] ABSTRACT

A firehose coupling comprising two end sections mountable on two hose ends, and a swivel section rotatably retained on one end section by a C-shaped retaining ring in an annular chamber defined by two grooves in telescoped portions of the two parts. The retaining ring is compressible into the inside groove with end portions of reduced thickness overlapped for assembly, beveled ends are closely spaced to prevent release of the swivel section without overlapping of the ends. As the swivel is threaded onto the other section, the retaining ring is clamped between opposite sidewalls of the grooves, positively preventing return of the ends to overlapped condition so that the ring is held captive in the partially expanded condition.

10 Claims, 4 Drawing Figures

PATENTED OCT 1 1974  3,838,873

3,838,873

HOSE COUPLING WITH CAPTIVE RETAINING RING

BACKGROUND OF THE INVENTION

This invention relates generally to hose couplings, and has particular reference to a disconnectable hose coupling of the type used on fire hoses, having two end sections mountable on the ends of the two hoses to be coupled, an intermediate swivel section that is loosely and rotatably mounted on one of the end sections, and a threaded connection between the swivel section and the other end section permitting selective coupling and uncoupling of the hoses.

In conventional couplings of this type, the practice has been to secure the swivel section rotatably to one of the end sections by means of a generally C-shaped retaining ring fitted in aligned grooves in telescoped, overlapping surfaces of the two parts, the two grooves defining an annular chamber in which the retaining ring is fitted to key the swivel section in place. The inside telescoping surface typically is a cylindrical extension on one of the end sections and is formed with an annular peripheral groove deep enough to permit the retaining ring to be compressed into the groove, as permitted by a circumferential gap in the retaining ring, for assembly of the two parts. The ring then is released to snap outwardly into an inwardly opening annular groove in the swivel section. This groove has an outside or bottom diameter less than the relaxed or free outside diameter of the ring, which thus is stressed inside the chamber formed by the two grooves.

The retaining ring is radially thick enough to extend into the inside groove and hold the swivel section against axial separation, while permitting relative rotation with some looseness that eliminates danger of jamming by dirt particles or the like. The rotatability of the swivel section is required because the hoses themselves cannot be rotated during the coupling operation, which is performed by inserting the threaded end of one coupling section into the swivel section and turning the swivel section until the threaded connection is tight. Hereinafter, for convenience of reference, the end coupling section carrying the swivel is called the female section, and the other end section is called the male section.

Unfortunately, the circumferential gap in the retaining ring that permits compression of the ring into the inside groove during assembly, also can permit accidental movement of the ring inwardly from the outside groove in service, for example, as a result of binding of the ring against a wall of the grooves as the swivel is being tightened on the male section. In addition to resulting in a failure of the coupling when the hoses may be urgently needed, this can be very dangerous to people in the vicinity, since such failures often occur as the hoses and the coupling are subjected to high fluid pressure.

For these reasons, some users simply will not accept such so-called "snap-ring" couplings. Efforts have been made to find a suitable alternative with a positively retained snap ring, but no practical alternative, that can be manufactured economically to sell at a competitive price, has as yet been found. For example, attempts have been made to provide so-called "still" thread (with zero pitch) for retaining the swivel, by expanding the end of the female section into axially interlocked relation with the swivel section. Such treatment has led to objectionable cracking of the hard protective coatings applied to the parts, either immediately or subsequently during the life of the coupling. Of course, a suitable swivel connection might be effected in various ways if expense were no object, but price considerations make it necessary to hold manufacturing costs within reasonable limits.

The primary objective of the present invention, therefore, is to provide a novel swivel-type coupling of the foregoing general character which can be fabricated and assembled economically, without need for maintaining close manufacturing tolerances, so as to be saleable at competitive prices, and which positively prevents failures of the type previously mentioned.

SUMMARY OF THE INVENTION

The foregoing objective is accomplished with a specially designed retaining ring which interacts with the three sections of the coupling to become positively locked in swivel-retaining relation as an incident to the threading of the male section into the swivel on the female section, an operation which heretofore has resulted in occasional failure of snap-ring couplings. More specifically, the retaining ring and the inside groove are designed to permit overlapping of the free end portions of the retaining ring in the groove during compression of the ring for assembly of the swivel section onto the female section, and the ring is dimensioned to expand into a condition in which the free ends are in closely spaced, circumferentially opposed relation in the two grooves, preventing re-compression of the ring into the inside groove. To hold the ends positively in opposed relation, the threading action of the swivel section and the male section is used to reduce the effective axial width of the retaining-ring chamber sufficiently to block movement of the ends back into the overlapped condition.

More specifically, as illustrated herein as part of the preferred embodiment of the invention, the retaining ring is generally C-shaped, when free, and has opposed free ends defining a circumferential gap that is sized to produce a very small gap when the ring is inside the swivel section in swivel-retaining relation therewith, the ends being so closely spaced in this condition as to prevent compression of the ring to a swivel-releasing size without overlapping of the adjacent end portions of the snap ring. The axial thickness of the end portions permits initial overlapping of the end portions within the inside groove, during assembly, and the adjacent ends of the male and female sections are in opposed relation so that the threading of the male section into the swivel section draws the two end sections tightly together, preferably against a sealing element, and serves to shift the swivel section axially relative to the female section to offset the grooves axially relative to each other. This effectively narrows the retaining-ring chamber to hold the ends of the retaining ring in circumferentially opposed relation.

To permit overlapping of the adjacent end portions of the retaining ring in the groove without excessive axial clearance, the end portions are reduced in axial thickness, preferably by notching opposite axial sides of the ring, but leaving a combined, overlapped thickness that is greater than the axial thickness of the remainder of the ring. Herein, each end portion is slightly more than ½ the thickness of the rest of the ring. For increased effectiveness as opposed blocking surfaces, the ends are formed as inclined wedge surfaces which, when forced together, tend to cam each other into increased engagement. When the effective axial width of the groove is reduced to the axial width of the ring, the ends are positively held in directly opposed relation, and very effectively prevent compression of the ring far enough to release the swivel section.

DESCRIPTION OF THE PREFERRED EMBODIMENT

Figure 1:
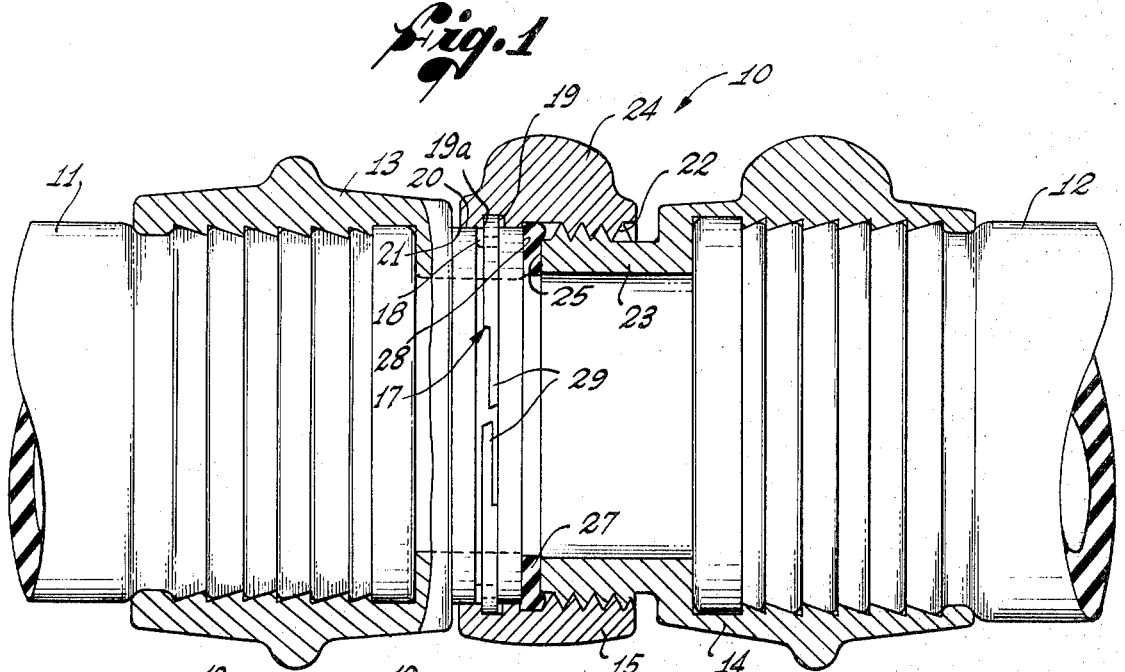
FIG. 1 is a fragmentary cross-sectional view taken longitudinally through a coupling embodying the novel features of the present invention, and illustrating the coupled condition of the parts.

As shown in the drawings for purposes of illustration, the invention is embodied in a fire hose coupling, indicated generally by the reference number 10, for connecting and disconnecting two hoses 11 and 12 and carrying fluid under pressure between the two hoses when they are connected. In general, the coupling comprises a first or female section 13 that is securely mounted on the free end of the hose 11, a second or male section 14 that is similarly mounted on the end of the hose 12, and third or swivel section 15 that is rotatably secured to the female section 13 by means of a resiliently flexible, split retaining ring 17. This ring is fitted in two opposed annular grooves 18 and 19 formed in two telescoped, overlapping surfaces 20 and 21 of the female section and the swivel section, respectively, to form a swivel connection keying the swivel section loosely on the female section. The two end sections may be sleeves that are suitably anchored on the ends of the hoses, and the swivel section is a ring of shorter axial length than the sleeves.

To permit selective coupling and uncoupling of the two hoses 11 and 12, the swivel section 15 is internally threaded at 22, and the male section 14 has an externally threaded end portion 23 for fitting into the swivel section. With the threaded portion of the male section pressed into the swivel section, the latter is rotated, with the assistance of peripheral lugs 24, to draw the male section into coupled relation, in which its inner end 25 is pressed against a gasket 27 confined in the swivel section against the inner end 28 of the female section 13. Thus, the gasket is compressed between the two end sections to prevent leakage of fluid when the coupling is pressurized.

As previously suggested, this general type of coupling has been conventional in the past, although not widely used. Assembly has been accomplished by making the retaining ring 17 with a circumferential gap and with an outside diameter normally larger than the diameter of the outside groove 19, and then compressing the ring radially or circumferentially into the inside groove 18 to permit the swivel section 15 to be fitted over the cylindrical surface 20 of the female section 13. When the two grooves are axially aligned, the ring is released to expand into the outside groove 19, as shown in FIG. 1, which is shallower than the radial thickness of the ring, but remains stressed and partially compressed. Accordingly, the inside portion of the ring is disposed in the inside groove, and the two sections are keyed rotatably together.

As previously mentioned, the problem with this type of coupling has been accidental recompression of the retaining ring 17 and resulting release of the swivel section 15 from the female section 13. This has occurred during or after threading of the male section into the swivel section, apparently as a result of binding of the ring in one of the two grooves as the swivel section is tightened around the threaded portion 23 of the male section, and has been so serious a defect as to prevent widespread acceptance of this type of coupling. Apart from this deficiency, however, this general type of coupling is desirable from the standpoint of economy of manufacture and ease of manipulation during the coupling and uncoupling operations.

In accordance with the present invention, the retaining ring 17 is formed with circumferentially separated free end portions 29 which can be overlapped in a groove 18 of acceptable axial width, and is sized to be compressible into condition for assembly only when the free end portions are overlapped. In the normal, assembled condition of the retaining ring, when it is partially expanded toward the free, relaxed condition (FIG. 1), its ends 30 are in closely spaced, circumferentially opposed relation, a relation which is positively maintained by reducing the effective axial width of the retaining-ring chamber (defined by the two grooves 18, 19) to less than the combined width of the free end portions, thereby preventing them from being returned inadvertently to the overlapped condition in which the swivel section 15 can be released.

More specifically, the preferred embodiment of the invention uses a retaining ring 17 in which the free end portions 29 are reduced in thickness from opposite axial sides for distances somewhat greater than the amount of overlap required during assembly, by forming cut-aways or notches 31 in the free end portions to a depth of less than ½ the axial thickness of the ring. The full thickness of the ring is less than the width of the inner groove 18 which is wide enough to receive the overlapped end portions, and also to maintain a degree of freedom for the swivel section after assembly and before coupling, so that dirt particles and the like will not bind in the swivel section and result in jamming during the coupling and uncoupling operations.

To reduce the effective width of the retaining-ring chamber, the swivel section 15 is shifted axially relative to the female section 13 as an incident to the coupling operation, to offset the grooves axially and clamp the retaining ring between one side wall 18a of the groove 18 and the opposite sidewall 19a of the groove 19. This is accomplished by first pulling the opposed ends 25 and 28 of the two end sections 13 and 14 into abutment with opposite sides of the gasket 27, and then further tightening the threaded connection to pull the swivel section 15 axially along the female section, until the abutting engagement of the sidewalls 18a and 19a with the sides of the retaining ring 17 prevents further axial movement.

Figure 2:
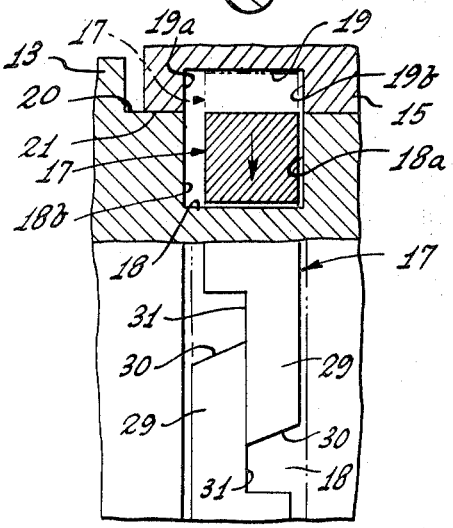
FIG. 2 is an enlarged fragmentary cross-sectional view similar to part of FIG. 1 and showing the radially compressed condition of the retaining ring during assembly of the swivel section onto the female section.

Since the groove 18 is wide enough to permit the free end portions 29 of the ring 17 to be overlapped, the ring can be radially compressed in this groove to an outside diameter smaller than the inside diameter of the swivel section 15, as shown in FIG. 2. Then the swivel section can be slipped onto the female section 13, over the cylindrical surface 20 thereof in which the groove 18 is formed, while the ring is held in the compressed condition by a suitable tool (not shown).

After the swivel section 15 is in place and the grooves 18 and 19 are generally aligned, the retaining ring 17 is released to spring outwardly into the outside groove 19, to the dotted-line position in FIG. 2. Since the ring is radially thicker than the depth of the outside groove 19, it interlocks the two grooved parts against axial separation, as long as the ring remains expanded into the outside groove. At the same time, it permits the swivel section 15 to rotate freely relative to the female section 13.

Figure 3:
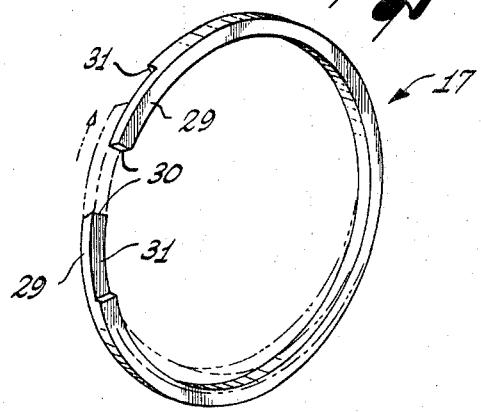
FIG. 3 is an enlarged fragmentary view similar to part of FIG. 2 and illustrating the permissible movement of the retaining ring when the coupling is in use, the position of the outside groove being indicated by a broken line.
Figure 4:
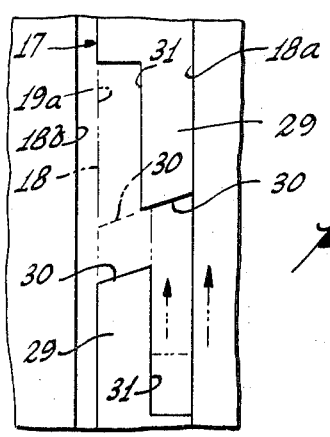
FIG. 4 is an isolated perspective view of the retaining ring, shown in its free condition with its compressed position being indicated by a broken line.

As the retaining ring 17 expands within the swivel section 15, the free end portions 29 spring apart, out of the overlapped condition shown in FIG. 2 and generally to the assembled condition shown in FIG. 1 and in full lines in FIG. 3, in which the free ends 30 are in closely spaced, generally circumferentially opposed relation. At this stage, it is possible for the free end portions 29 to return to the circumferentially overlapped condition, but there are no forces tending to do so, and the memory of the ring material preferably is such that there is some axial overlap of the ends, as shown in full lines in FIG. 3. Thus, movement of the free end portions back toward the circumferentially overlapped condition is at least partially blocked. Preferably, the free ends are formed as beveled or inclined cam surfaces which, if forced together, tend to cam each other into increased surface engagement. This enhances the blocking capability of the ends.

When the hoses 11 and 12 are to be coupled, the threaded portion 23 is inserted into the swivel section 15, which then is rotated to draw the threaded section into engagement with the gasket 27. When the gasket becomes tightly clamped between the two adjacent ends 25 and 28 of the end sections, resistance to continued inward motion of the male section 14 results in a reactive force on the swivel section, tending to shift this section to the right, as viewed in FIG. 1, relative to the female section. In this manner, any axial looseness of "play" in the mounting of the swivel section is taken up, and it is pulled to the right until the retaining ring 17 is clamped between the opposed sidewalls 18a and 19a of the grooves 18 and 19.

When this occurs, the free end portions 29 of the ring 17 are positively locked in the axially overlapped, circumferentially opposed positions, since the combined axial thickness of the end sections is greater than the effective width of the annular retaining-ring chamber. Should the clamping force exerted by the final rotation of the swivel section 15 tend to compress the retaining ring, the amount of compression permitted by the gap between the ends 30 is insufficient to permit disengagement of the retaining ring from the groove 19 in the swivel section. Accordingly, the retaining ring is positively held captive in its operative condition. Although the grooves 18 and 19 are the presently preferred means for providing two opposed walls 18a and 19a on opposite sides of the retaining ring 17, it can be seen in FIG. 1 that the other two walls 18b and 19b are inoperative and unnecessary when the coupling is in the operative condition.

It will be apparent that the various parts may be made in different sizes, and that dimensional relationships should be considered in relative terms, rather than as important from a specific viewpoint. The free or relaxed outside diameter of the ring 17 should be at least as large as the bottom or outside diameter of the outside groove 19, and the radial thickness of the ring should be sufficiently greater than the depth of the outside groove to insure that the ring extends inwardly to a substantial extent into the inside groove 18 when released in the outside groove. The two grooves may be of substantially equal axial width, and sufficiently wider than the ring to provide a degree of limited "play" for the swivel section 15 and to permit the ring to be received in the inside groove with the end portions 29 overlapped, preferably with a close fit when the end portions are overlapped.

The gap between the ends 30 in the free condition of the retaining ring 17 is sufficient to accommodate the partial compression in outside diameter to the diameter of the bottom of the outside groove 19 without circumferential overlap, and should be sufficiently larger to insure clearance between the ends 30 when the ring is compressed to this outside diameter. The size of gap satisfying this requirement can be calculated for any given set of dimensions.

From the foregoing, it will be evident that the present invention provides a snap-ring coupling 10 in which the retaining ring 17 is effective to hold the swivel section 15 rotatably in place when the male section 14 is uncoupled, and in which the ring is positively held captive when the male section is threaded tightly into the properly coupled condition. Thus, the coupling is a significant improvement over prior couplings of this general type, and is much less susceptible to failures of the kind previously described.

It also will be evident that, while a specific embodiment has been illustrated and described, various modifications and changes may be made without departing from the spirit and scope of the invention.

I claim:

1. A hose coupling having, in combination:

first and second end sections in the form of sleeves mountable on the ends of two hoses to be coupled, and a swivel section in the form of a ring disposed between said end sections, said first section having a cylindrical portion and said swivel section having a cylindrical internal surface on one side telescoped loosely over said cylindrical portion;

said second section having a generally cylindrical portion formed with external threads, and said swivel section having an internally threaded side opposite said one side for threadedly receiving said second section and securing the swivel section thereto;

means defining two annular grooves in the telescoped portions of said first section and said swivel section, in the adjacent surfaces thereof, said grooves opening toward each other and being aligned in one relative axial position of said first and swivel sections to define an annular retaining ring chamber of predetermined axial width;

a resiliently flexible, generally C-shaped retaining ring in said chamber in radially compressed and stressed condition, having an outside surface abutting against the bottom of the groove in said swivel section, an inner portion extending into the groove in said first section, and an inner side spaced from the bottom of the groove in said first far enough to permit said ring to be compressed into the first section for insertion thereof into said swivel section;

said retaining ring being substantially narrower in axial width than the width of said grooves, and having two ends defining between them a circumferential gap when the ring is free, the end portions of said ring adjacent said gap being of reduced axial width permitting overlapping of said portions when said retaining ring is compressed into the groove in said first section, and having a combined thickness less than the axial width of said chamber;

and a sealing gasket between said cylindrical end portions within said swivel section to be clamped between said first and second sections when the second section is threaded into said swivel section, thereby to seal between said end sections and also to draw said swivel section toward said second section relative to said first section, to offset said grooves axially relative to each other toward opposite sides of said retaining ring and reduce the effective axial width of said chamber to less than the combined axial width of said end portions of said retaining ring;

said ends of said retaining ring being in a predetermined opposed and closely spaced relation when said retaining ring is compressed and stressed in said chamber and said grooves are axially offset, thereby to positively prevent return of said end portions of said ring to overlapped condition.

2. A hose coupling as defined in claim 1 in which said ends of said retaining ring are beveled to cam the ends into increased surface engagement when forced together.

3. A hose coupling as defined in claim 1 in which said end portions are notched from opposite axial sides, each to a thickness over one-half the thickness of the remainder of the ring.

4. A hose coupling having first and second opposite end sections for connection to the ends of two hoses to be coupled, a third section between said end sections and telescoped rotatably with said first section, ane means forming a threaded connection between said second and third sections for releasably coupling the hoses together;

means defining two annular grooves in the adjacent surfaces of the telescoped portions of said first and third sections, opening toward each other to define an annular retaining-ring chamber formed partially in each telescoped section, said chamber having axially spaced side walls each formed partially in each telescoped section;

a resiliently flexible, generally C-shaped retaining ring disposed in said chamber and having an outside diameter, when free, larger than the inside diameter of the outer of the telescoped sections, and a radial thickness greater than the depth of the groove in the outer of the telescoped sections thereby to key the telescoped sections against axial separation;

said retaining ring having end surfaces disposed in opposed relation within said chamber and disposed close enough together to abut against each other and prevent radial flexing of the ring to an outside diameter less than the inside diameter of the outer telescoped section, and said grooves having axial widths sufficient to receive said ring in said chamber with said ends in overlapped relation during assembly of said coupling;

and means operable during threading of said second and third sections together, into tightly joined relation, to shift said first and third sections and the grooves therein axially relative to each other, and to confine said ring axially against returning of said ends to overlapped relation, whereby said ring is positively maintained in captive condition in said chamber and cannot release said telescoped sections from the telescoped relation.

5. A hose coupling as defined in claim 4 in which said retaining ring has a preselected axial width less than the width of said grooves, and the portions of said ring adjacent said opposed ends are substantially reduced in combined width to an amount greater than the width of the ring, thereby permitting overlapping of said ends with a combined width of less than twice the width of the ring.

6. A hose coupling as defined in claim 5 in which said opposed ends are inclined to form opposed wedge surfaces for camming said ends into increasing surface engagement when said ends are forced together.

7. A hose coupling as defined in claim 4 in which said first section has a cylindrical portion telescoped with a loose fit inside said third section, the outside groove in said third section has a depth less than the radial thickness of said ring, the inside groove in said cylindrical portion has a depth greater than the radial thickness of said ring, said grooves have approximately equal axial widths greater than the axial width of said ring by an amount less than the axial width of the ring, and the ring has an outside diameter, when free, greater than the outside diameter of the outside groove, the end portions of said ring being notched at said ends to a reduced combined thickness greater than the axial width of the ring but less than the width of the inside groove.

8. A hose coupling as defined in claim 7 in which said means for shifting said first and third sections axially during threading of said second section to said third section comprise opposed surfaces on said first and second sections through which the second section forces the first section in one direction while the threading operation draws the third section in the opposite direction.

9. A hose coupling as defined in claim 8 further including a sealing gasket confined between said opposed surfaces for sealing said coupling.

10. A hose coupling having first and second end sections mountable on the ends of two hoses to be coupled, and a third section telescoped rotatably with said first section;

means forming a threaded connection between said second and third sections for releasably coupling the hoses together;

a first wall on said first section facing axially toward said second section, and a second wall on said third section facing axially toward said first wall, said walls forming opposite sidewalls of an annular retaining-ring chamber;

a resiliently flexible split retaining ring in said chamber between said first and second walls and having free ends disposed in circumferentially opposed relation, said ring being compressible in said chamber, when the ends are circumferentially overlapped, to an assembly condition permitting telescoping of said first and third sections together and to bring said walls into spaced relation with opposite sides of said retaining ring, said ring being disposed in opposed relation with both of said walls when released in said chamber;

said free ends being circumferentially spaced, when said ring is released in said chamber, to prevent compression of said ring to said assembly condition without overlapping of said ends;

and means operable as an incident to threading of said second and third sections together to shift said walls toward opposite sides of said ring into a condition in which said ends are blocked against returning to the overlapped condition.

* * * * *

PO-1050
(5/69)

UNITED STATES PATENT OFFICE
CERTIFICATE OF CORRECTION

Patent No. 3,838,873   Dated 10/1/74

Inventor(s) Gilbert, Stephen J.

It is certified that error appears in the above-identified patent and that said Letters Patent are hereby corrected as shown below:

In the ABSTRACT, line 8, before "beveled" please insert:

--and partially expands into a condition in which its opposed,--

Column 7, line 49, change "ane" to --and--.

Signed and sealed this 17th day of December 1974.

(SEAL)
Attest:

McCOY M. GIBSON JR.
Attesting Officer

C. MARSHALL DANN
Commissioner of Patents